(12) United States Patent
Sporn

(10) Patent No.: US 10,667,494 B2
(45) Date of Patent: Jun. 2, 2020

(54) SHOCK RESISTANT TETHER

(71) Applicant: Joseph S Sporn, New York, NY (US)

(72) Inventor: Joseph S Sporn, New York, NY (US)

( * ) Notice: Subject to any disclaimer, the term of this patent is extended or adjusted under 35 U.S.C. 154(b) by 173 days.

(21) Appl. No.: 15/053,830

(22) Filed: Feb. 25, 2016

(65) Prior Publication Data
US 2017/0245471 A1    Aug. 31, 2017

(51) Int. Cl.
*A01K 27/00* (2006.01)

(52) U.S. Cl.
CPC .......... *A01K 27/005* (2013.01); *A01K 27/003* (2013.01)

(58) Field of Classification Search
CPC ..... A01K 27/00; A01K 27/003; A01K 27/005
USPC ......................................................... 119/793
See application file for complete search history.

(56) References Cited

U.S. PATENT DOCUMENTS

| 4,745,883 | A | * | 5/1988 | Baggetta | A01K 27/005 119/770 |
| 4,993,366 | A | * | 2/1991 | Sager | A01K 27/005 119/798 |
| 5,247,906 | A | * | 9/1993 | Stevenson | A01K 27/003 119/792 |
| 7,293,531 | B2 | * | 11/2007 | Young, III | A01K 27/005 119/797 |
| 7,997,235 | B2 | * | 8/2011 | Hurwitz | A01K 27/006 119/793 |
| 8,151,737 | B1 | * | 4/2012 | Alonzo | A01K 27/003 119/798 |
| 9,374,984 | B2 | * | 6/2016 | McCay | A01K 27/005 |
| 9,510,565 | B2 | * | 12/2016 | Leon | A01K 27/005 |
| 2005/0227833 | A1 | * | 10/2005 | Wilkinson | A63B 21/0004 482/124 |
| 2015/0013621 | A1 | * | 1/2015 | Kaiser | A01K 27/001 119/793 |

* cited by examiner

*Primary Examiner* — Monica L Barlow
*Assistant Examiner* — Aaron M Rodziwicz
(74) *Attorney, Agent, or Firm* — Hanes & Bartels LLC

(57) ABSTRACT

A shock absorbing tether comprising an elongated flexible primary strand which is surrounded by a longitudinally elastic casing having terminal ends and which is attached to the primary strand at each of its terminal ends and at at least one point intermediate the terminal ends.

4 Claims, 2 Drawing Sheets

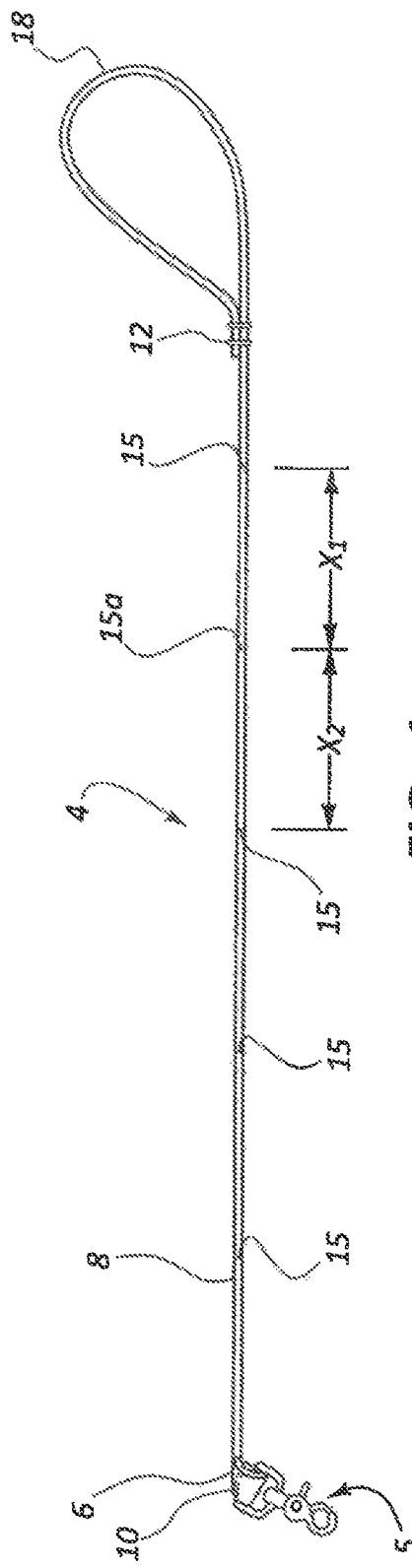
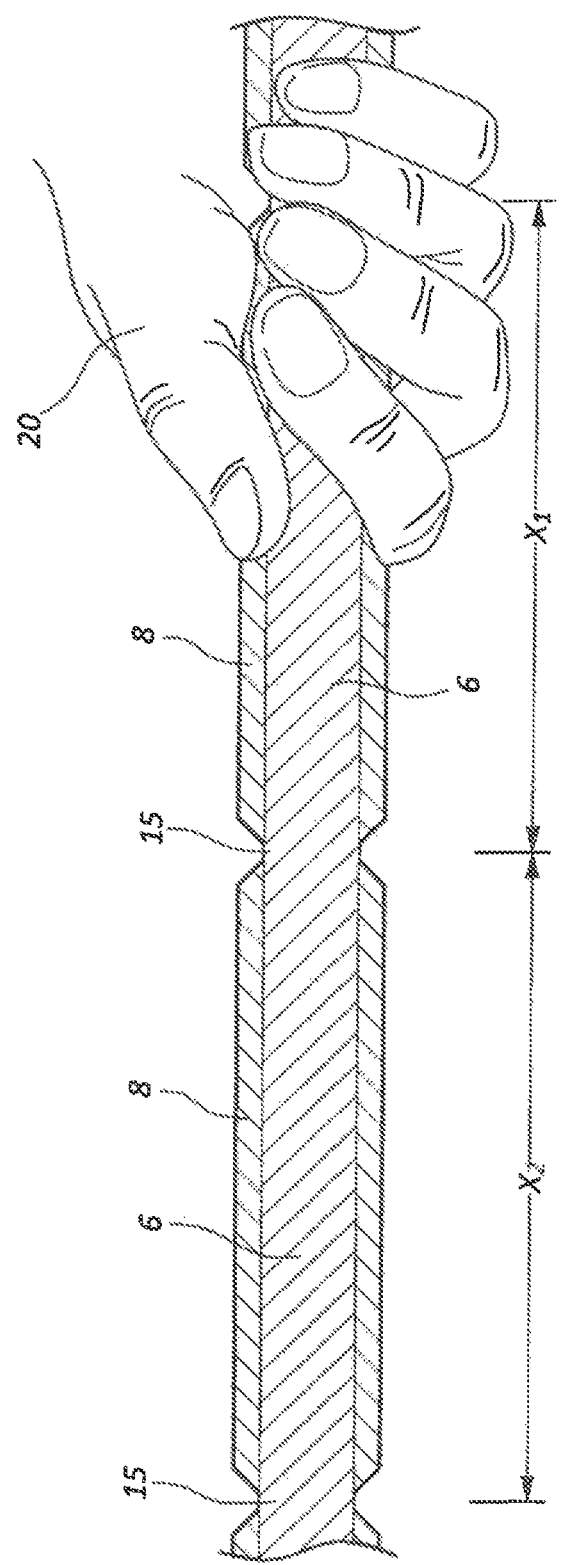

SHOCK RESISTANT TETHER

The present invention relates generally to tethers, such as leashes, cords, ropes and cables, and apparatus for mitigating the shock to the handlers of such tethers upon the application of sudden tension forces to the tether.

BACKGROUND

Animal leashes designed with shock reducing capability are well known in the art but all such leashes of the prior art rely in some way on the elasticity of at least some part of the leash strand itself. Examples of these shock absorbing leashes are seen in a sampling of prior U.S. patents.

U.S Pat. No. 2,275,701 to Taylor discloses a dog leash embodying an elastic lead strap in association with a rigid tube which substantially houses the strap when the latter is in its retraced position.

Gregory McPhail discloses a shock absorber leash in U.S. Pat. No. 5,146,876 that contains an elastic member in parallel with a non-elastic member in order to limit the extension of the elastic member.

U.S. Pat. No. 7,188,585 to Carter discloses a shock absorber leash having a plurality of strap subassemblies, one of non-elastic material and one of an elastic strip whose ends are attached to a cam buckle that adjusts the length of the elastic strip. The non-elastic portion limits the extension of the elastic strip. The foregoing examples of shock absorbing leashes all rely on the elasticity of the leash strand itself.

The primary object of the present invention is to mitigate shock to the handler of a variety of tethers, including animal leashes, where the tether strand itself is non-elastic.

SUMMARY OF THE INVENTION

As used in this disclosure "tether strand" or "strand" is used in the broad sense as being any kind of rope, cable, cord or other elongated flexible member that anchors a movable object or thing to a reference point, which may be fixed or moving. An animal leash is but one of many examples of the application of the invention to a tether strand and will be explained as the preferred form of the invention.

Most animal leashes are provided with a handle or handgrip disposed at the proximal end of the leash. Abrupt tension forces applied to the leash by the animal's jerking or other sudden movement results in sudden movement and shock to the grasping hand/s of the handler. The present invention mitigates the shock, whether the handler is griping the leash by the handgrip or at some point intermediate the animal's collar and the handgrip. The shock absorbing advantages of the present invention apply to any type of tether where the handler or manipulator is required to grasp the tether at some point along its length in order to control or maneuver the animal or object attached to the tether. The shock absorbing feature of the tether of the present invention is found in a longitudinally elastic casing that surrounds at least a portion of the length of the tether strand and which is secured to the strand at each of the casing's terminal ends and at one or more intermediate points between the ends of the casing. While gripping the exterior casing, sudden tension on the tether strand results in longitudinal stretching of the casing allowing the griping handis of the handler to remain in a relatively constant position and eliminating what otherwise would be a shock to the handler.

BRIEF DESCRIPTION OF THE DRAWINGS

FIG. 1 is a side view of a tether, such as an animal leash, that incorporates the elements of the present invention, including an interior strand encased by a tubular elastic casing. The drawing shows the intermediate anchor points between sections of the leash where the elastic casing surrounding the strand is sewn or otherwise attached to the strand, the length of each section between the intermediate anchor points being denominated as $X_1$ and $X_2$.

FIG. 2 is an enlarged fragmentary longitudinal cross sectional view of two sections of the tether showing the hand of a handler griping the exterior casing of the tether at a distance from the closest anchor point that attaches the exterior casing to the interior strand.

DETAILED DESCRIPTION OF PREFERRED EMBODIMENT

Figure 3:
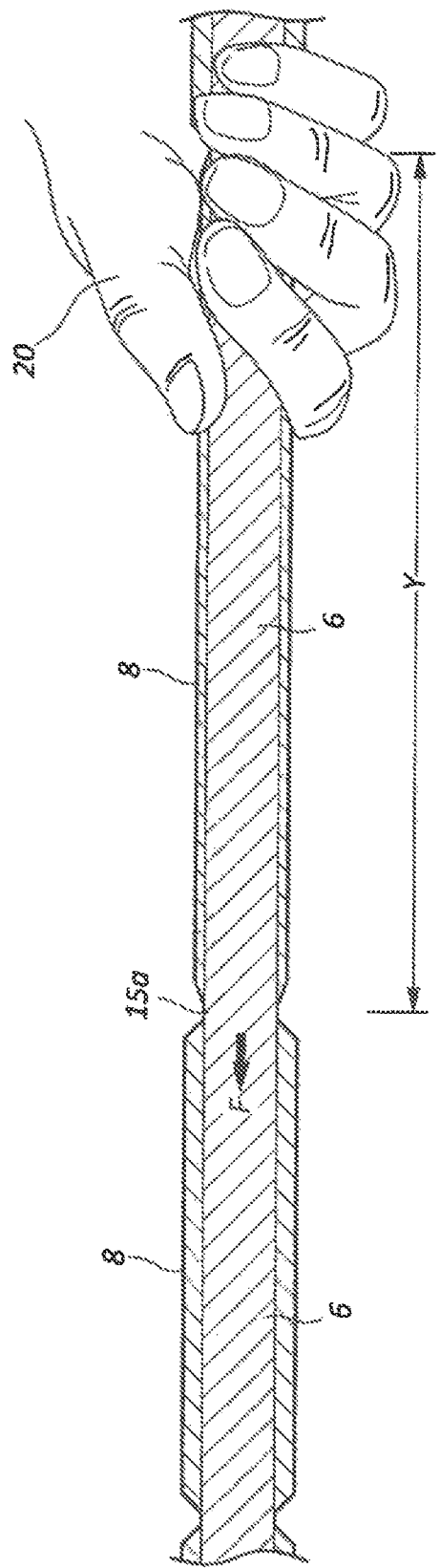
FIG. 3 is an enlarged fragmentary longitudinal cross sectional view of section $X_1$ showing a tension force F being applied to the strand to move it toward the source of the application of the force while the hand of the handler remains in a relatively constant position.

FIG. 1 depicts the preferred form of the present invention as an animal leash 4. However, the invention may be applied to any elongated strand that constitutes a tether and which is being handled or manipulated and for which it is desired to provide shock absorption to the handler. The elongated strand 6 forming the interior of the leash may be a woven web or equivalent ("web"). In other applications the strand may be rope, cord, cable or the like. In the illustrated embodiment the web 6 is encased by a longitudinally elastic casing 8 whose terminal ends 10 and 12 are sewn to or otherwise secured to the web 6. The casing 8 is also secured to the interior web at intermediate points 15 between the terminal ends of the casing. The sections of the tether 4 between the intermediate points of attachment 15 are referred to in FIGS. 1 and 2 as $X_1$ and $X_2$. A handle 18 is formed by a loop of the distal end of the tether folded back upon itself and attached to the tether 4.

The event of the handler controlling the tether 4 by grasping it below the handle 18 is depicted in FIG. 2 which also shows in cross section the web 6 inside of the tubular elastic casing 8 with two intermediate anchor points 15 that secure the casing to the web 6. The length of the sections $X_1$, $X_{20}$r $X_n$ depends on the type of elastic material comprising the casing and the total length of the tether and the casing. The length of the sections can vary from one foot to several feet. The elastic material is preferably Spandex, Lycra or similar synthetic material.

FIG. 3 illustrates the action of the shock absorbing function of the present invention. The hand 20 of the handler grips the casing 8 at a point below the handle 18. Force F is applied to the web, for example through a fastener 5 that may be connected to an animal collar or harness or other force producing agent. The force F tends to move the web 6 in the direction of the force arrow F. In the illustrated example of FIG. 3, the force F moves the anchor point 15a toward the point of force application which applies a stretching force to the casing 8 that is above the anchor point 15a. The casing above the anchor point 15a is held in place by the hand 20 which remains in a relatively constant position, achieving the shock absorption result from the stretched length Y of the elastic casing.

The benefit of the intermediate attachment points 15 results from those points shortening the distance between the hand of the handler and the point from which the stretching force on the casing occurs. Shortening this distance provides maximum stretching of the casing relative to the strand and consequent maximum shock resistance. A given stretching force on the elastic casing is absorbed over the whole length of the casing to which the force is applied. Therefore, long distances between the hand and the anchor point result is less stretch of the casing relative to the strand. The intermediate attachment points shorten the distance between the anchor point of the casing and the position of the hand, resulting in greater stretch of the casing for a given force and consequently greater shock absorption.

I claim:

1. A shock absorbing tether comprising,
an elongated flexible strand,
a longitudinally elastic casing having terminal ends and surrounding the strand and attached to the strand at each of the casing's terminal ends and at a plurality of spaced apart points intermediate the casing's terminal ends.

2. The tether of claim 1 where the strand has first and second ends and the terminal ends of the casing are attached to the strand proximate the strand's first and second ends.

3. A shock absorbing tether comprising,
an elongated flexible strand having first and second ends,
a longitudinally elastic casing having terminal ends and surrounding the flexible strand where the terminal ends of the casing are attached to the flexible strand at the strand's first and second ends and the casing is attached to the flexible strand at a plurality of points intermediate the terminal ends of the casing.

4. A shock absorbing tether comprising,
an elongated strand having first and second ends,
a fastener connected to the first end of the strand,
a handgrip comprising a loop formed by the second end of the strand folded back upon said strand and where the second end is secured to the strand,
a longitudinally elastic casing having terminal ends and encasing the strand where the terminal ends of the casing are attached to the strand proximate the strand's first and second ends and the casing is attached to the strand at a plurality of points intermediate the fastener and the point where the second end is secured to the strand.

* * * * *